(12) United States Patent
Park et al.

(10) Patent No.: US 8,291,350 B1
(45) Date of Patent: *Oct. 16, 2012

(54) GESTURE-BASED METADATA DISPLAY

(75) Inventors: Tim Park, Santa Cruz, CA (US); Jeff Yaksick, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,098

(22) Filed: Sep. 30, 2011

Related U.S. Application Data

(63) Continuation of application No. 13/009,439, filed on Jan. 19, 2011.

(51) Int. Cl.
*G06F 3/033* (2006.01)
*G06F 3/03* (2006.01)
(52) U.S. Cl. ........ 715/863; 715/705; 715/715; 715/763; 715/781
(58) Field of Classification Search .......... 715/705–715, 715/762–763, 781, 817–825, 863
See application file for complete search history.

(56) References Cited

U.S. PATENT DOCUMENTS

| | | | | |
|---|---|---|---|---|
| 5,877,766 A | * | 3/1999 | Bates et al. | 715/854 |
| 7,840,912 B2 | * | 11/2010 | Elias et al. | 715/863 |
| 7,877,705 B2 | * | 1/2011 | Chambers et al. | 715/835 |
| 7,886,229 B2 | * | 2/2011 | Pachet | 715/726 |
| 7,937,380 B2 | * | 5/2011 | Spiegelman et al. | 707/705 |
| 2003/0158855 A1 | * | 8/2003 | Farnham et al. | 707/102 |
| 2004/0003042 A1 | * | 1/2004 | Horvitz et al. | 709/204 |
| 2004/0054670 A1 | * | 3/2004 | Noff et al. | 707/3 |
| 2009/0319181 A1 | * | 12/2009 | Khosravy et al. | 701/208 |
| 2010/0122174 A1 | * | 5/2010 | Snibbe et al. | 715/733 |
| 2011/0145275 A1 | * | 6/2011 | Stewart | 707/769 |
| 2011/0154268 A1 | * | 6/2011 | Trent et al. | 715/863 |
| 2011/0164058 A1 | * | 7/2011 | Lemay | 345/651 |
| 2011/0167382 A1 | * | 7/2011 | van Os | 715/800 |

* cited by examiner

*Primary Examiner* — Nicholas Augustine
(74) *Attorney, Agent, or Firm* — Shumaker & Sieffert, P.A.

(57) ABSTRACT

In general, embodiments of the present disclosure are directed to techniques for quickly displaying metadata of media objects (e.g., music files) using gestures. In one example a method includes, generating for display a browsing view including browsing content, wherein the browsing content includes one or more media objects; receiving user input including one or more gestures to select at least one media object; determining an input operation that selects a quantity of metadata associated with the selected media object, wherein the metadata includes information that describes the selected media object, and wherein the quantity of the metadata is proportional to a detected property of the one or more gestures to select the media object; and generating for display in an expanded view, the metadata associated with the at least one selected media object.

27 Claims, 5 Drawing Sheets

GESTURE-BASED METADATA DISPLAY

This application is a continuation of U.S. application Ser. No. 13/009,439, filed Jan. 19, 2011 the entire contents of which are incorporated herein by reference.

TECHNICAL FIELD

This disclosure relates to electronic devices and, more specifically, to graphical user interfaces of electronic devices.

BACKGROUND

A user may interact with applications executing on a computing device (e.g., mobile phone, tablet computer, smart phone, or the like). For instance, a user may install, view, or delete an application on a computing device.

In some instances, a user may interact with a mobile device (e.g., mobile phone, tablet computer, smart phone, or the like) through a graphical user interface. For instance, a user may interact with a graphical user interface using a presence-sensitive display of the mobile device.

SUMMARY

In one example, a method includes, generating for display, in a graphical user interface (GUI) of a computing device, a browsing view including browsing content, wherein the browsing content includes one or more media objects that are displayable in the browsing view; receiving, using a presence-sensitive screen of the computing device, user input including one or more gestures to select at least one media object of the one or more media objects; responsive to receiving the user input, determining an input operation that corresponds to the user input, wherein the input operation selects a quantity of metadata associated with the at least one selected media object, wherein the metadata includes information that describes the at least one selected media object, and wherein the quantity of the metadata is proportional to a detected property of the one or more gestures to select the at least one media object; and generating for display, in an expanded view of the GUI that includes the browsing view, the metadata associated with the at least one selected media object.

In one example, a computer-readable storage medium is encoded with instructions that when executed cause one or more processors of a computing device to perform operations comprising: generating for display, in a graphical user interface (GUI) of the computing device, a browsing view including browsing content, wherein the browsing content includes one or more media objects that are displayable in the browsing view; receiving, using a presence-sensitive screen of the computing device, user input including one or more gestures to select at least one media object of the one or more media objects; responsive to receiving the user input, determining an input operation that corresponds to the user input, wherein the input operation selects a quantity of metadata associated with the at least one selected media object, wherein the metadata includes information that describes the at least one selected media object, and wherein the quantity of the metadata is proportional to a detected property of the one or more gestures to select the at least one media object; and generating for display, in an expanded view of the GUI that includes the browsing view, the metadata associated with the at least one selected media object.

In one example, a computing device includes: one or more processors; an output device, to generate for display, a browsing view, in a graphical user interface (GUI) of the computing device, including browsing content, wherein the browsing content includes one or more media objects that are displayable in the browsing view; a presence-sensitive screen to receive user input including one or more gestures to select at least one media object of the one or more media objects; means, responsive to receiving the user input, for determining an input operation that corresponds to the user input, wherein the input operation selects a quantity of metadata associated with the at least one selected media object, wherein the metadata describes the at least one selected media object, and wherein the quantity of the metadata is proportional to a detected property of the one or more gestures to select the at least one media object; and wherein, the output device generates for display, in an expanded view of the GUI that includes the browsing view, the metadata associated with the at least one selected media object.

In one example, a method includes displaying one or more media objects at least one of which having metadata associated therewith, wherein the metadata includes information that describes the at least one media object; receiving one or more gestures to select the at least one media object; detecting, by a computing device, a property of the one or more gestures; selecting, by the computing device, a quantity of the metadata associated with the at least one selected media object, wherein the quantity of the metadata is proportional to the detected property of the one or more gestures; and displaying the selected quantity of the metadata associated with the at least one selected media object.

The details of one or more examples of this disclosure are set forth in the accompanying drawings and the description below. Other features, objects, and advantages of the disclosure will be apparent from the description and drawings, and from the claims.

DETAILED DESCRIPTION

In general, aspects of the present disclosure are directed to techniques for quickly displaying metadata of media objects (e.g., music files) using gestures. In some examples, users store media objects on computing devices, such as tablet personal computers and mobile devices. Media objects may include, for example, a collection of music files, a collection of picture files, or an address book with multiple address entries. In some examples, a computing device includes large collections of stored media objects. For example, a tablet personal computer (PC) may include a collection of thousands of music files. Each music file in the collection may contain metadata such as song title, song artist, production year, album title, etc. When navigating through a large collection of music files, a user may find it difficult to locate a single music file particularly when a user interface displays the metadata associated with each music file. To aid the user, a user interface organizes the collection of music files using visual abstractions. In one example, the user interface displays a collection of visual indicators, e.g., album cover images, which correspond to the music song files stored on the computing device. The album cover images may display minimal or no metadata. In this way, a user can quickly navigate through the album cover images to locate a particular album or song without the visual congestion generated by excess metadata.

When searching for a particular song in a music collection, a user may find it beneficial to quickly view the metadata associated with an album cover image. For example, an application executing on a tablet PC displays a collection of album cover images. The tablet PC further includes a presence-sensitive screen (e.g., a touchscreen). In one example, the user performs a gesture, e.g., a pinch gesture, at a position on or near the screen that displays an album cover image. In response to the gesture, the application displays, in an expanded view, the metadata associated with album cover image such as the artist, album title, and production year. In other examples, the application instantly displays in an expanded view the metadata of songs associated with the album cover image. In one example, the amount of metadata displayed in the expanded view is proportional to the detected property of the gesture. For example, a pinch open gesture spanning the entire screen may display a large amount of metadata, while a pinch open gesture spanning only a small portion of the screen may display less metadata. In this way, a user may perform a gesture to quickly view metadata associated with a visual indicator such as an album cover image. The user may also, in some examples, perform a gesture, such as a pinch close gesture, to display fewer metadata details. Such techniques are particularly advantageous because metadata may be quickly displayed to the user.

Figure 1:
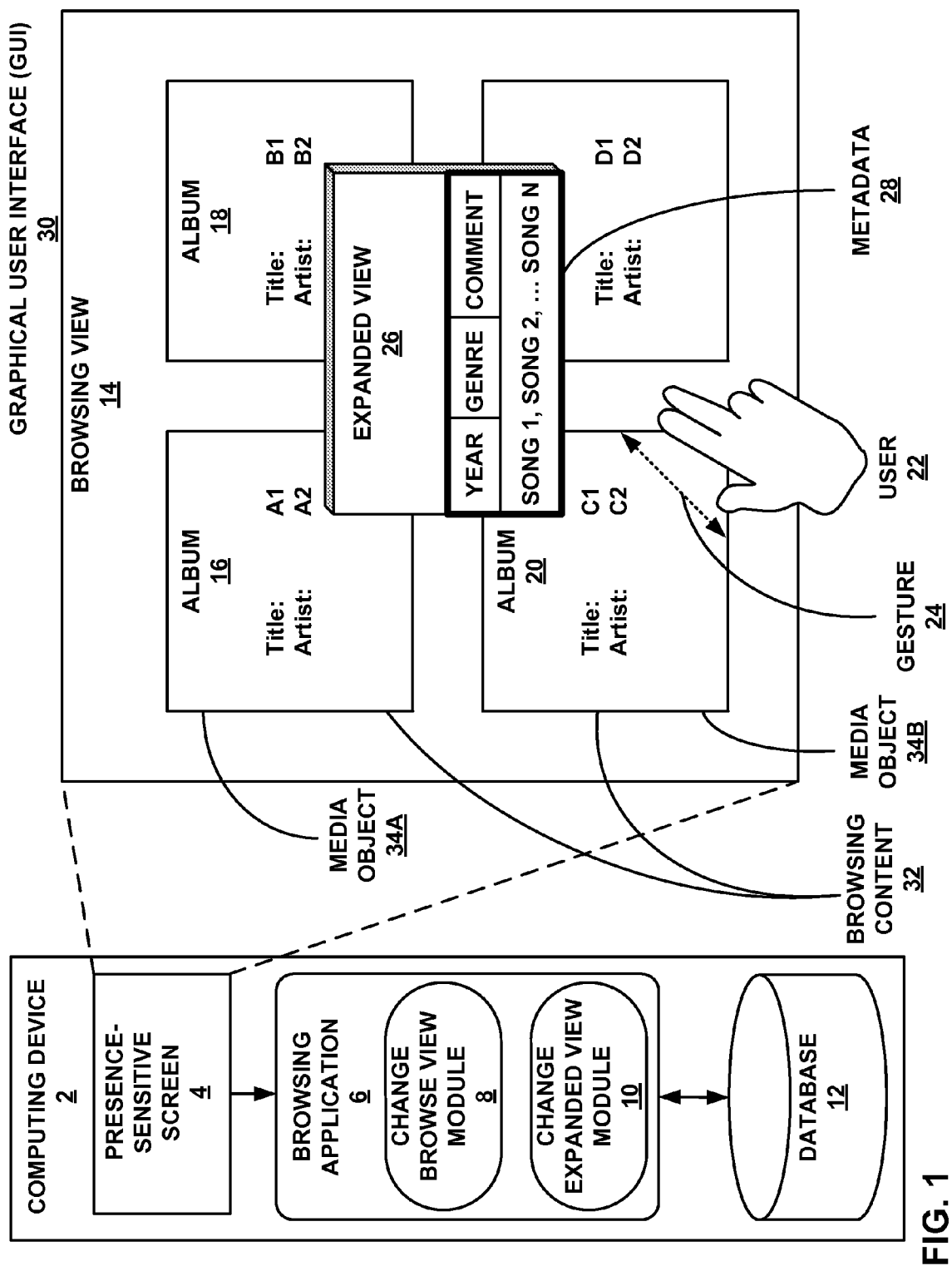
FIG. 1 is a block diagram illustrating an example of a system including a computing device that may be configured to execute one or more applications in accordance with one or more aspects of the present disclosure.

FIG. 1 is a block diagram illustrating an example of a system including a computing device 2 that may be configured to execute one or more applications, e.g., browsing application 6, in accordance with one or more aspects of the present disclosure. Computing device 2, in some examples, includes or is a part of a portable computing device (e.g. mobile phone/netbook/laptop/tablet device) or a desktop computer. Computing device 2 may also connect to a network including a wired or wireless network. One non-limiting example of computing device 2 is further described in the example of FIG. 2.

Computing device 2, in some examples, includes an input device, e.g., presence-sensitive screen 4. Presence-sensitive screen 4, in one example, generates one or more signals corresponding to a location selected by a gesture on or near the presence-sensitive screen 4. In some examples, the gesture is a physical touch of the screen to select the corresponding location, e.g., in the case of a touch-sensitive screen. In other examples, presence-sensitive screen 4 detects the presence of a pointing device, e.g., a finger that is in close proximity to, but does not physically touch, presence-sensitive screen 4. Presence-sensitive screen 4, in some examples, generates a signal corresponding to the location of the pointing device. Signals generated by the selection of the corresponding location are then provided as data to components of computing device 2.

In other examples, computing device 2 may include an input device such as a joystick, camera or other device capable of recognizing a gesture of a user. For example, a user may perform a gesture in mid-air while holding a joystick that may transmit user input information to computing device 2. Upon detecting the mid-air gesture, a corresponding user input be received by computing device 2 from the joystick. In other examples, a camera capable of transmitting user input information to computing device 2, may visually identify a gesture performed by a user. Upon visually identifying the gesture of the user, a corresponding user input may be received by computing device 2 from the camera. The aforementioned examples are provided for illustration purposes and other similar example techniques may also be suitable to detect a gesture and detected properties of a gesture.

In some examples, computing device 2 includes an output device, e.g., presence-sensitive screen 4. In some examples, presence-sensitive screen 4 may be programmed by computing device 2 to display graphical content. Graphical content, generally, includes any visual depiction displayed by presence-sensitive screen 4. Examples of graphical content may include images, text, videos, and/or visual program components such as scroll bars, text boxes, buttons, etc. In one example, graphical content may include browsing content 32. For example, browsing application 6 may cause presence-sensitive screen 4 to display browsing content 32 in browsing view 14.

In one example, browsing application 6 executes on computing device 2. Browsing application 6 may include program instructions and/or data that are executed by computing device 2. In one example browsing application 6 displays a browsing view 14. Browsing view 14 may include browsing content 32, such as media objects 34A, 34B. In some examples, browsing application 6 displays an expanded view 26. Expanded view 26 may further include metadata 28. Browsing application 6, in some examples, includes change browsing view module 8 and change expanded view module 10. In other examples, browsing application 6 communicates data to and from database 12. In one example browsing application 6 receives data corresponding to a user input from presence sensitive screen 4. In one example, browsing application 6 includes a graphical user interface (GUI) 30 that enables user 22 to interact with browsing application 6 through presence-sensitive screen 4.

In some examples, presence-sensitive screen 4 displays GUI 30 of browsing application 6. GUI 30 may include interactive and/or non-interactive graphical content that displays information of computing device 2 in human-readable form. In one example, GUI 30 enables user 22 to interact with one or more applications through gesture 24 received by presence sensitive screen 4. In other examples, GUI 30 enables a user 22 to create, modify, and/or delete data of computing device 2 in a similar manner. In one example, GUI 30 enables user 22 to interact with browsing application 6. For example, browsing application 6 may include GUI 30, which may display a button. A user may select the button by performing gesture 24 on or near presence-sensitive screen 4. In response to receiving user input, e.g., the gesture, to select the button, browsing application 6 may perform a function associated with the button, such as displaying an updated set of media objects.

In some examples, browsing application 6 includes a browsing view 14. In one example browsing view 14 includes browsing content 32. Browsing content 32 may include media objects 34A, 34B, images, text, videos, visual program components, or any other visual depiction. In some examples, media objects 34A, 34B are software objects. For example, a software object may be a data file, such as an image file, music file, video file, text file or any other type of file. In other examples, media objects 34A, 34B may be data structures stored and/or executed by computing device 2, such as image data, music data, video data, text data, or any other type of data. In some examples, media objects may be associated with other media objects. For example, a first media object may be an image file of a music album image. A second and third media objects may be music data files. In one example, the image file of the music album image may be associated with the second and third media objects, i.e., music data files.

In some examples, metadata 28 is associated with media objects 34A, 34B. In one example, metadata 28 is data about media objects 34A, 34B. For example, media objects 34A, 34B may be may be music album images that are associated with music files stored on computing device 2. A music album 16 may include a collection of songs. For example, the music group The Beatles produced a music album Abbey Road containing numerous songs. In some examples, various metadata describe the media object, e.g., the music album Abbey Road. In one example, metadata associated with the music album Abbey Road includes a production year (1969), album genre (Rock), album title (Abbey Road), and album artist (The Beatles). In some examples, metadata 34A, 34B is stored in and retrieved from database 12 by computing device 2. In one example, metadata 34A, 34B is stored in and retrieved from database 12 by browsing application 6.

In some examples, media objects 34A, 34B may be displayed in browsing view 14. Browsing application 6 may arrange media objects 34A, 34B in browsing view 14 in various different layouts. For example, browsing application 6 may display media objects 34A, 34B in a list, tiles (as shown in FIG. 1), or other layout based on user input from user 22. In some examples, browsing application 6 may change browsing content 32 in response to gesture 24. For example, user 22 may perform a swipe gesture on presence-sensitive 4, which causes browsing application 6 to display different browsing content, e.g., different media objects 34A, 34B. In this way, user 22 may navigate through a collection of media objects.

In one example, example, user 22 provides a gesture 24, e.g, a swipe gesture, to change the media objects to be displayed in browsing view 14. In response to receiving gesture 24, change browsing module 8 may query database 12 to select a next or previous set of media objects to display in browsing view 14. In other examples, any type of touch gesture, e.g., a pinch, de-pinch, tap, double-tap, long-press, etc., may be used by change browse view module 8 to change the media objects displayed in browsing view 14. More generally, a gesture includes a motion of at least one input unit at or near presence-sensitive screen 4. An input unit includes a finger, input stylus, or pen, to name only a few examples.

In some examples, user 22 may perform gesture 24 that displays an expanded view 26. In some examples, expanded view 26 includes information associated with one or more media objects 34A, 34B. For example, metadata 28 may be displayed in expanded view 26. In one example, user 22 performs a gesture 24, e.g., a pinch open gesture, on or near presence-sensitive screen 4. In response to receiving gesture 24, change expanded view module 10 may display expanded view 26. Expanded view 26, in one example, includes metadata 28 associated with media object 34A.

In some examples, expanded view 26 is generated for display by change expanded view module 10. In some examples, expanded view 26 is generated for display by change expanded view module 10 without changing browsing content 32 in browsing view 14 of GUI 30. For example, user 22 may perform gesture 24 on or near presence sensitive-screen 4. In response to gesture 24, change expanded view module 10 displays expanded view 26 without changing browsing content 32, i.e., media objects 34A, 34B remain unchanged. Other media objects included in browsing view 14, e.g., album 18, also remain unchanged. In some examples, expanded view 26 may be displayed translucently so that the view of browsing content 32 is unobstructed from the view of user 22.

In one example, user 22 performs gesture 24 to select media object 34B, i.e., album 20, in order to display metadata 28 in expanded view 26. In one example, user 22 performs a pinch open touch gesture on or near presence sensitive-screen 4 to select album 20. In response to gesture 24, change expanded view module 10 selects metadata 28 associated with album 20 from database 12. Change expanded view module 10 then displays expanded view 26, which includes metadata 28. In one example, the quantity of metadata 28 that is displayed in expanded view 26 is proportional to the detected property of gesture 24 used to select media object 34B.

In some examples, the detected property of a touch gesture is the touch pressure applied to presence-sensitive screen 4, the speed at which the touch gesture is performed, the amount of time in which the touch gesture is performed, the distance traveled or length of the touch gesture near or on the presence-sensitive screen, or quantity of touch gestures performed by the user. More generally, a detected property may be any feature or attribute of a gesture determinable by computing device 2. In one example, a pinch open gesture includes touching two fingers at substantially the same location on or near presence-sensitive screen 4 and moving the two fingers in approximately opposite directions away from each other. In one example, two fingers performing a pinch open gesture move approximately two inches apart from each other. The detected property of the pinch open gesture may therefore be measured by the distance the two fingers move apart from each other. In another example, two fingers performing a pinch open gesture move approximately three inches apart from each other. In this case, the three inch distance is a larger detected property than a two inch distance. Thus, the detected property of the touch gesture, in present example, includes the distance traveled of the fingers at or near the presence-sensitive screen.

As previously described herein, in some examples, the quantity of metadata 28 that is displayed in expanded view 26 is proportional to the detected property of gesture 24 used to select media object 34B. In one example, user 22 performs a pinch open gesture using two fingers to selected media object 34B, wherein the distance between the two fingers after the touch gesture has completed is two inches. In response to receiving gesture 24, change expanded view module 10 determines that the distance between the two fingers is two inches. Change expanded view module 10 selects and includes Year, Genre and Comment in expanded view 26 in response to the detected property of gesture 24. In another example, user 22 may perform a pinch open gesture to select media object 34B, wherein the distance between the two fingers after the touch gesture has completed is three inches. In response to receiving gesture 24, change expanded view module 10 determines that the distance between the two fingers is three inches. Change expanded view module 10 selects and includes Year, Genre, Comment, and, additionally, a list of song including Song 1-Song N associated with media object 34B. In this way, the quantity of metadata displayed in expanded view 26 is proportional to the detected property of the touch gesture performed by user 22. In various aspects of the disclosure, the gesture does not magnify, i.e., enlarge or increase the size of, media objects presently displayed in browsing view 14.

Instead, a gesture performed by a user may change the quantity of metadata displayed in proportion to the detected property of the gesture. In some examples, a detected property of a gesture may not distinguish different "types" of gestures. Thus, in one example, a detected property of a gesture may not be used to distinguish between a first type of a gesture, e.g., a single tap, and a different, second type of gesture, e.g., a double tap. Instead, the quantity of metadata displayed may change in proportion to the detected property of the gesture.

Various aspects of the disclosure may provide, in certain instances, one or more benefits and advantages. For example, an expanded view 26 generated in response to gesture 24 provides user 22 with a quick and intuitive method of viewing metadata associated with media objects. In particular, various aspects of the disclosure minimize visual congestion that may be produced by displaying large quantities of metadata at the same time. Instead, in some examples, only metadata minimally necessary to identify media objects, e.g., Title, Artist, and Album Image, is displayed. When the user wishes to view metadata of a particular media object, the metadata is readily available with a touch gesture. Using a smaller set of metadata minimizes visual congestion, improves navigation of large media collections, and enables the user to quickly browse through a collection of many media objects.

Another advantage may include viewing metadata without changing the browsing content 32 displayed in browsing view 14. By displaying metadata in an expanded view, the number of touch gestures required to view metadata associated with a media object is reduced. Additionally, media objects remain in view for the user even as the user views metadata in the expanded view. The aforementioned benefits and advantages are exemplary and other such benefits and advantages may be apparent in the previously-described non-limiting examples. While some aspects of the present disclosure may provide all of the aforementioned exemplary benefits and advantages, no aspect of the present disclosure should be construed to necessarily require any or all of the aforementioned exemplary benefits and advantages.

In some examples, the quantity of metadata 28 displayed in expanded view 26 increases continuously as user 22 performs gesture 24. For example, user 22 may perform a pinch open touch gesture to select media object 34B. The pinch open gesture may be performed such that two fingers are placed substantially together on or near presence-sensitive screen 4 and are moved substantially apart from each other. As the touch gesture is performed, the quantity of metadata displayed in expanded view 26 increases. Similarly, user 22 may perform a pinch close gesture such that two fingers placed substantially apart on or near presence-sensitive screen 4 and are moved substantially towards each other. In one example, user 22 may perform a pinch close gesture. The pinch close gesture may continuously decrease the quantity of metadata 28 displayed in expanded view 26. For example, expanded view 26 may initially display metadata 28 that includes Year, Genre, Comment, and songs associated with media object 34B, e.g., Song 1-Song N. As user 22 performs the pinch close gesture, only Year, Genre, Comment metadata may be displayed. If user 22 continues to perform the pinch close gesture, expanded view 26 may be removed from browsing view 14.

In some examples, the quantity of metadata 28 displayed in expanded view 26 increases only when user 22 has completed performance of gesture 24. For example, user 22 may perform a pinch open touch gesture to select media object 34B. Only when the touch gesture has completed, e.g., when the fingers of user 22 have finished moving and/or are removed from presence-sensitive screen 4, does expanded view 26 change the quantity of metadata 28 displayed. For example, if user 22 performs a pinch open touch gesture, the quantity of metadata 28 displayed in expanded view 26 changes only after user 22 has completed performance of the touch gesture.

Expanded view 26 may be displayed in various ways in response to touch gestures. In one example, expanded view 26 remains open after gesture 24 has been completed. For example, user 22 may perform a pinch open gesture to select media object 34B. In response to the pinch open gesture, change expanded view module 10 may select metadata 28 and display expanded view 26, which includes metadata 28. Upon completion of the pinch open gesture, expanded view 26 may continue to display in browsing view 14. To remove expanded view 26 from display, user 22 may perform a subsequent terminating gesture. A terminating gesture may include any gesture that may be received at or near presence-sensitive screen 4. In another example, expanded view 26 is displayed in browsing view 14 only during the duration of gesture 24. For example, user 22 may perform a pinch open gesture that causes change expanded view module 10 to display metadata 28. Upon completing the pinch open gesture, e.g., removing fingers on or near the presence-sensitive screen that performed the gesture, expanded view 26 is removed from browsing view 14.

In some examples, expanded view 26 may overlay browsing content 32. For example, expanded view 26 may be displayed on top of media objects 34A, 34B. In some examples, expanded view 26 may be partially transparent or translucent such that browsing content 32 is still visible when overlaid by expanded view 26. In this way, user 22 may still view unchanged browsing content 32 when expanded view 26 is displayed in browsing view 14.

Figure 2:
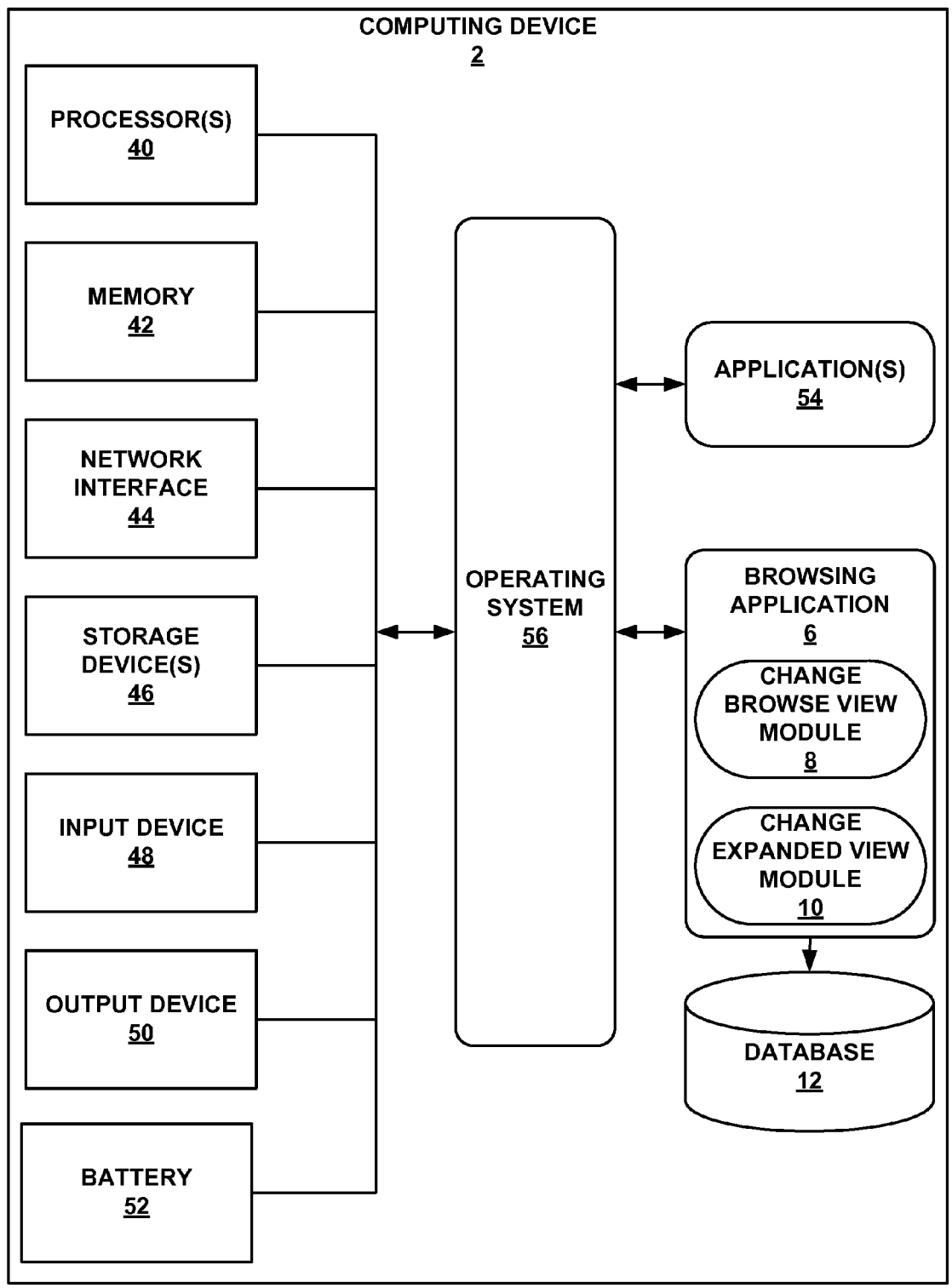
FIG. 2 is a block diagram illustrating further details of one example of computing device 2 shown in FIG. 1, in accordance with one or more aspects of the present disclosure.

FIG. 2 is a block diagram illustrating further details of one example of computing device 2 shown in FIG. 1, in accordance with one or more aspects of the present disclosure. FIG. 2 illustrates only one particular example of computing device 2, and many other example embodiments of computing device 2 may be used in other instances.

As shown in the specific example of FIG. 2, computing device 2 includes one or more processors 40, memory 42, a network interface 44, one or more storage devices 46, input device 48, output device 50, and battery 52. Computing device 2 also includes an operating system 56, which may include modules that are executable by computing device 2. Computing device 2, in one example, further includes one or more applications 54 and a browsing application 6. One or more applications 54 and browsing application 6 are also executable by computing device 2. Each of components 40, 42, 44, 46, 48, 50, 52, 54, 56, 6, and 12 may be interconnected (physically, communicatively, and/or operatively) for inter-component communications.

Processors 40, in one example, are configured to implement functionality and/or process instructions for execution within computing device 2. For example, processors 40 may be capable of processing instructions stored in memory 42 or instructions stored on storage devices 46.

Memory 42, in one example, is configured to store information within computing device 2 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 2 (e.g., one or more of applications 54) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes a network interface 44. Computing device 2, in one example, utilizes network interface 44 to communicate with external devices via one or more networks, such as one or more wireless networks. Network interface 44 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 2 utilizes network interface 44 to wirelessly communicate with an external device (not shown) such as a server, mobile phone, or other networked computing device.

Computing device 2, in one example, also includes one or more input devices 48. Input device 48, in some examples, is configured to receive input from a user through tactile, audio, or video feedback. Examples of input device 48 include a presence-sensitive screen (e.g., presence-sensitive screen 4 shown in FIG. 1), a mouse, a keyboard, a voice responsive system, or any other type of device for detecting a command from a user. In some examples, a presence-sensitive screen comprises a touch-sensitive screen. In some examples, input device 48 includes a microphone and/or video camera.

One or more output devices 50 may also be included in computing device 2. Output device 50, in some examples, is configured to provide output to a user using tactile, audio, or video stimuli. Output device 50, in one example, includes a presence-sensitive screen (e.g., presence-sensitive screen 4 shown in FIG. 1), sound card, a video graphics adapter card, or any other type of device for converting a signal into an appropriate form understandable to humans or machines. Additional examples of output device 50 include a speaker, a cathode ray tube (CRT) monitor, a liquid crystal display (LCD), or any other type of device that can generate intelligible output to a user.

Computing device 2, in some examples, include one or more batteries 52, which may be rechargeable and provide power to computing device 2. Battery 52, in some examples, is made from nickel-cadmium, lithium-ion, or other suitable material.

Computing device 2 may include operating system 56. Operating system 56, in some examples, controls the operation of components of computing device 2. For example, operating system 56, in one example, facilitates the interaction of application 58 or identification application 60 with processors 40, memory 42, network interface 44, storage device 46, input device 48, output device 50, battery 52, and short-range transmitter 54. Examples of operating system 56 may include Android®, Apple iOS®, Blackberry® OS, Symbian OS®, Linux®, and Microsoft Windows Phone 7®.

Computing device 2, in some examples, further includes browsing application 6 (e.g., also shown in FIG. 1). Browsing application 6, in one example, further includes a change browse view module 8. Change browse view module 8, in some examples, includes instructions that cause browsing application 6 executing on computing device 2 to perform the operations and actions described in FIGS. 1-5. For example, in response to receiving a touch gesture, change browse view module 8 may select media objects display to output device 50. In some examples, change browse view module 8 selects media objects from database 12. In other examples, change browse view module 8 changes the layout of media objects displayed in a browsing view (e.g., browsing view 14 shown in FIG. 1) in response to a touch gesture. For example, a user may provide a touch gesture that changes the media objects displayed from a list view to a panel view.

Browsing application 6, in one example, further includes change expanded view module 10. Change browse view module 8, in some examples, includes instructions that cause browsing application 6 executing on computing device 2 to perform the operations and actions described in FIGS. 1-5. For example, change browse view module 8 may generate for display a browsing view that includes browsing content. In some examples the browsing content includes one or more media objects displayable in the browsing view. In some examples, in response to receiving a touch gesture at computing device 2, change expanded view module 10, may select media objects and/or metadata from database 12 for display in an expanded view. In other examples, change expanded view module 10 may, in response to receiving a touch gesture at computing device 2, determine an input operation corresponding the user input. The input operation may select a quantity of metadata associated with the at least one selected media object. In some examples the input operation selects a quantity of metadata proportional to the detected property to display in an expanded view. In some examples, change expanded view module 10 may be programmed with settings that specify the quantity metadata to display for a particular detected property of a touch gesture.

Computing device 2, in some examples, further includes database 12 (e.g., database 12 shown in FIG. 1). For example, database 12 may include Relational Database Management System (RDBMS) software. In one example, database 12 may be a relational database and accessed using a Structured Query Language (SQL) interface that is well known in the art. Database 12 may alternatively be stored on a separate networked computing device and accessed by a network interface or system bus. Database 12 may in other examples be an Object Database Management System (ODBMS), Online Analytical Processing (OLAP) database or other suitable data management system. In some examples, metadata is stored in and retrieved from database 12. In some examples, media objects are stored in and/or retrieved from database 12 by browsing application 6. In some examples, browsing application 6 may store and/or retrieve media objects from database 12.

Any applications, e.g., applications 54 or browsing application 6, implemented within or executed by computing device 2 may be implemented or contained within, operable by, executed by, and/or be operatively/communicatively coupled to components of computing device 2, e.g., processors 40, memory 42, network interface 44, and/or storage devices 46.

Figure 3:
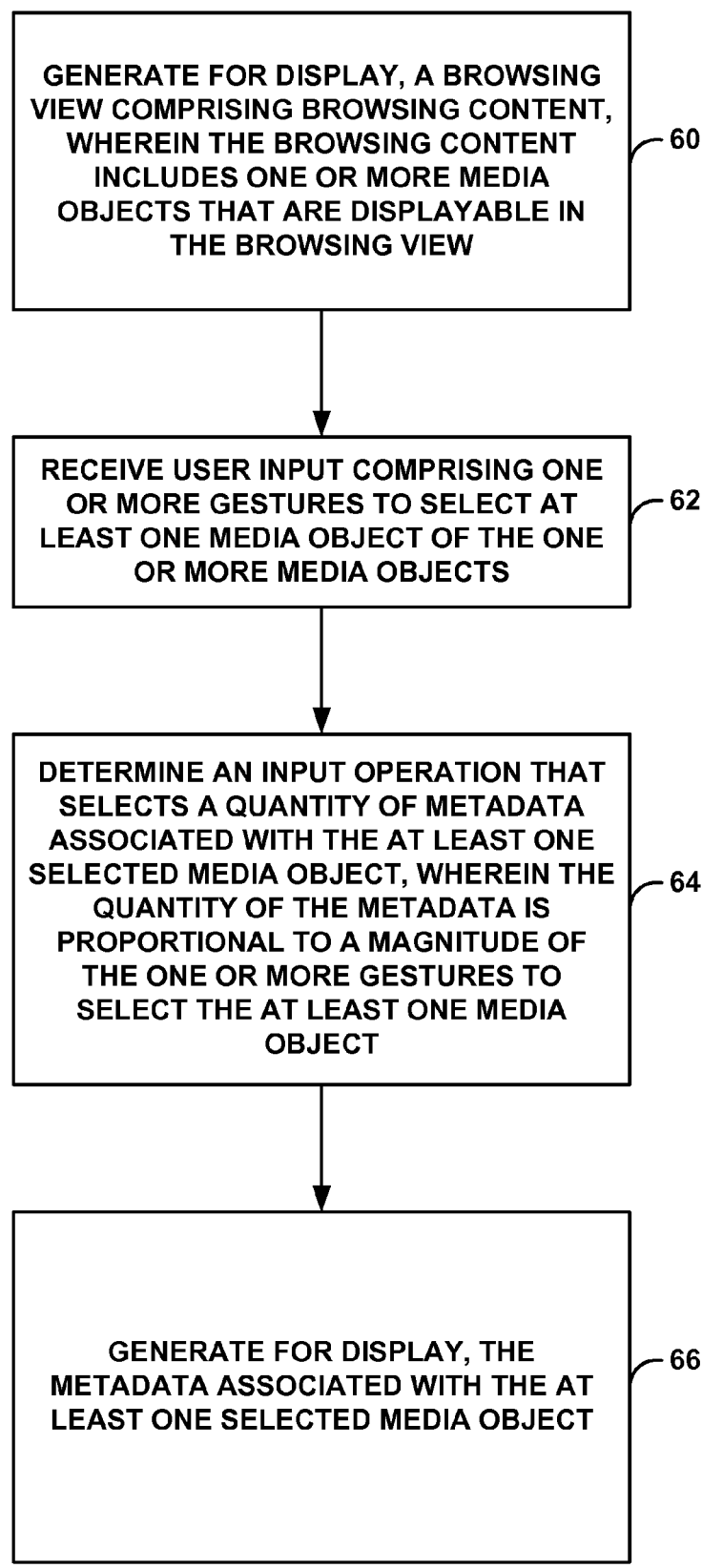
FIG. 3 is a flow diagram illustrating an example method that may be performed by a computing device to display metadata of media objects using gestures.

FIG. 3 is a flow diagram illustrating an example method that may be performed by a computing device to display metadata of media objects (e.g., music files) using gestures.

For example, the method illustrated in FIG. 3 may be performed by computing device 2 shown in FIGS. 1 and/or 2.

The method of FIG. 3 includes, generating for display, in a graphical user interface (GUI) of a computing device, a browsing view including browsing content, wherein the browsing content includes one or more media objects that are displayable in the browsing view (60). The method further includes receiving, using a presence-sensitive screen of the computing device, user input including one or more gestures to select at least one media object of the one or more media objects (62). The method further includes responsive to receiving the user input, determining an input operation that corresponds to the user input, wherein the input operation selects a quantity of metadata associated with the at least one selected media object, wherein the metadata includes information that describes the at least one selected media object, and wherein the quantity of the metadata is proportional to a detected property of the one or more gestures to select the at least one media object (64). The method further includes generating for display, in an expanded view of the GUI that includes the browsing view, the metadata associated with the at least one selected media object (66).

In some examples, generating for display, in the expanded view of the GUI that includes the browsing view, the metadata associated with the at least one selected media object, further includes continuously changing the metadata generated for display as the one or more gestures are received. In some examples, generating for display, in the expanded view of the GUI that includes the browsing view, the metadata associated with the at least one selected media object includes changing the quantity of the metadata generated for display only after at least one of the one or more gestures is received. In some examples, the one or more media objects include one or more music files, image files, video files, or text files. In some examples, the method includes, responsive to receiving the user input, determining a second input operation that corresponds to the user input, wherein the second input operation selects a second quantity of second metadata associated with a second selected media object, wherein the second metadata includes information that describes the second selected media object, and wherein the second quantity of the second metadata is proportional to the detected property of the one or more gestures; and generating for display, in the expanded view of the GUI, the metadata associated with the second selected media object.

In some examples, the presence-sensitive screen includes a touch-sensitive screen. In some examples, the one or more gestures include one or more touch gestures. In some examples, generating for display, in the expanded view of the GUI, the metadata associated with the at least one selected media object further includes: removing the expanded view from display in the GUI when at least one of the one or more gestures is completed. In some examples, the method includes wherein generating for display, in the expanded view of the GUI, the metadata associated with the at least one selected media object further includes: displaying the expanded view of the GUI after the one or more gestures have completed; and receiving, using the presence-sensitive screen of the computing device, a terminating gesture, wherein upon completing the terminating gesture, the expanded view of the GUI is removed from display on the presence-sensitive screen.

In some examples, the method includes wherein generating for display, in the expanded view of the GUI further includes, generating for display the expanded view of the GUI to overlay the browsing content of the browsing view. In some examples, the method includes, wherein the one or more gestures to select the at least one media object of the one or more media objects include a motion of at least one input unit at or near the presence-sensitive screen. In some examples, the at least one input unit includes, a finger, input stylus, or pen. In some examples, the detected property of the one or more gestures includes an amount of pressure applied to the presence-sensitive screen by the at least one input unit when the one or more gestures are performed.

In some examples, the detected property of the one or more gestures includes a rate at which the at least one input unit moves across or near the presence-sensitive screen. In some examples, the detected property of the one or more gestures includes an amount of time during which the at least one input unit performs the one or more touch gestures. In some examples, the detected property of the one or more gestures includes a distance traveled of the at least one input unit across or near the presence-sensitive screen. In some examples, the one or more gestures do not magnify the one or more media objects displayable in the browsing view.

In one example, a method includes displaying one or more media objects at least one of which having metadata associated therewith, wherein the metadata includes information that describes the at least one media object. The method further includes receiving one or more gestures to select the at least one media object. The method further includes detecting, by a computing device, a property of the one or more gestures. The method further includes selecting, by the computing device, a quantity of the metadata associated with the at least one selected media object, wherein the quantity of the metadata is proportional to the detected property of the one or more gestures. The method further includes displaying the selected quantity of the metadata associated with the at least one selected media object.

In some examples, the one or more gestures to select the at least one media object of the one or more media objects include a motion of at least one input unit at or near the presence-sensitive screen. In some examples, the at least one input unit includes, a finger, input stylus, or pen. In some examples, the detected property of the one or more gestures includes an amount of pressure applied to the presence-sensitive screen by the at least one input unit when the one or more gestures are performed. In some examples, the detected property of the one or more gestures includes a rate at which the at least one input unit moves across or near the presence-sensitive screen. In some examples, the detected property of the one or more gestures includes an amount of time during which the at least one input unit performs the one or more touch gestures. In some examples, the detected property of the one or more gestures includes a distance traveled of the at least one input unit across or near the presence-sensitive screen. In some examples, the expanded view is generated for display without changing the browsing content in the browsing view of the GUI.

Figure 4A:
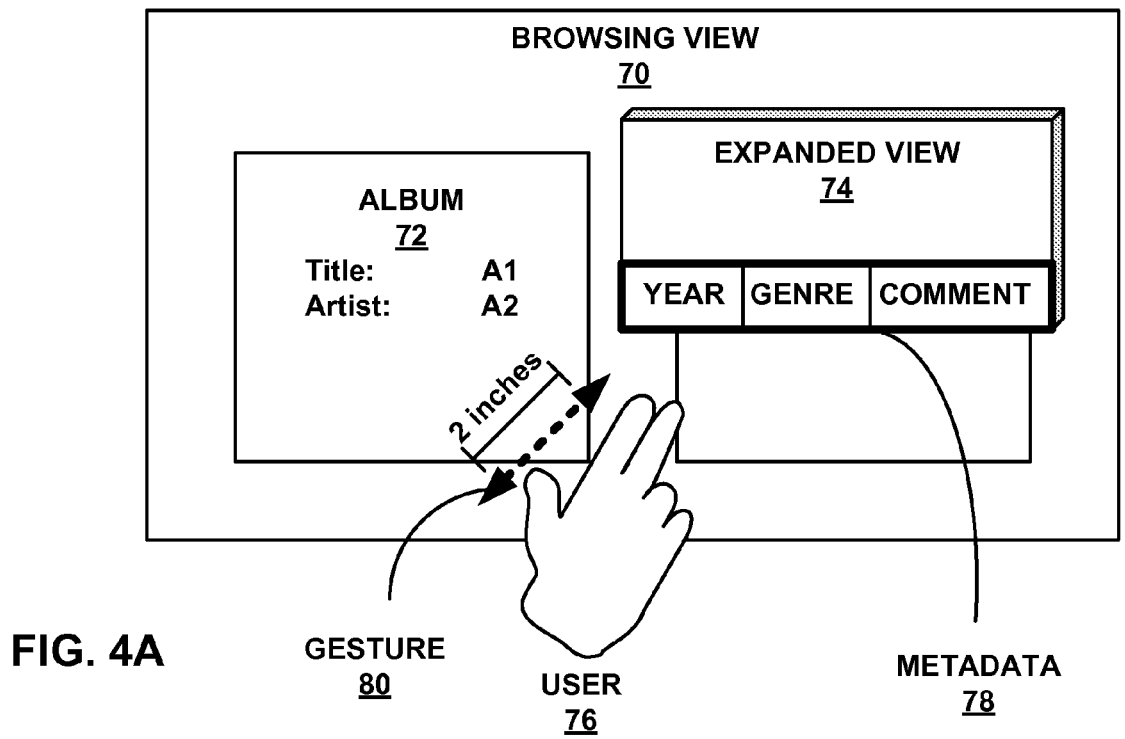
FIGS. 4A and 4B are a block diagrams illustrating examples of displaying metadata in proportion to the detected properties of received gestures, in accordance with one or more aspects of the present disclosure.
Figure 4B:
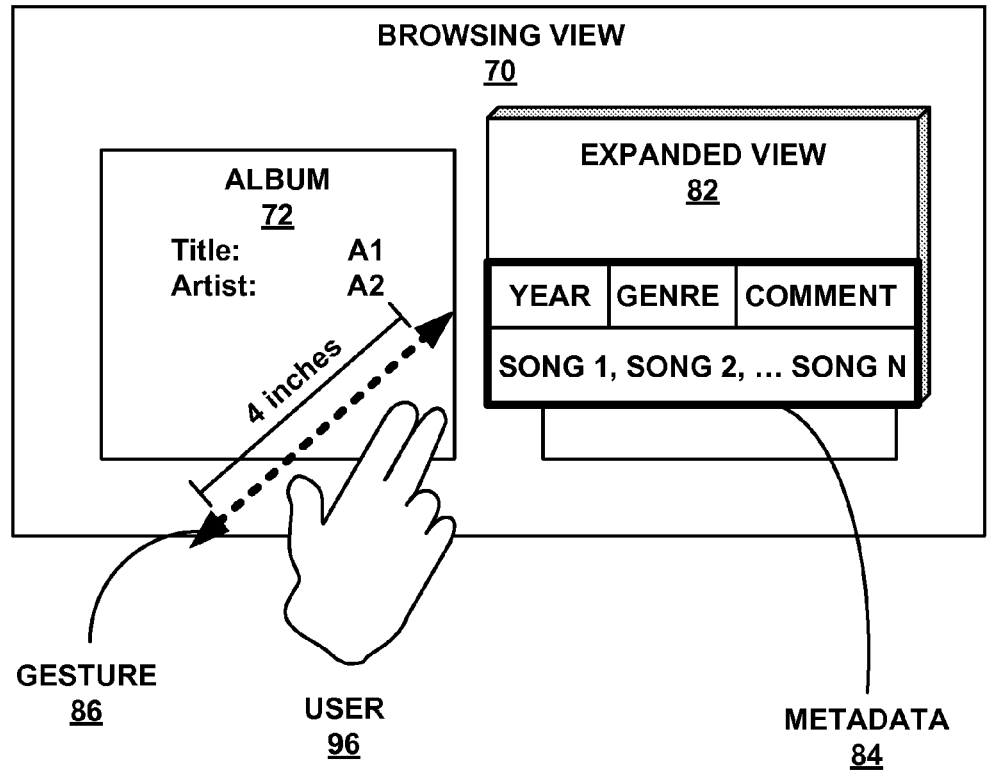

FIGS. 4A and 4B are a block diagrams illustrating examples of displaying metadata in proportion to the detected propertys of touch gestures, in accordance with one or more aspects of the present disclosure. For example, FIG. 4A includes a browsing view 70 of a computing device (not shown) similar to computing device 2 as shown in FIG. 1. Browsing view 70 includes two media objects, including an image of album 72. In the example of FIG. 4A, a user 76 performs a gesture 80 on or near a presence-sensitive screen (not shown) of the computing device. In the example of FIG. 4A, gesture 80 is a pinch open gesture. User 22's fingers move two inches apart when performing the pinch open gesture. Consequently, the detected property of gesture 80 is determined by the distance of two inches. A module executing on the computing device (e.g., change expanded view module 10 as shown in FIGS. 1, 2) determines that a quantity of metadata 78 including the Year, Genre, and Comment of Album 72 that is proportional to the two-inch distance of gesture 80. The computing device subsequently displays an expanded view 74 that includes metadata 78. As shown in FIG. 4A, browsing content such as albums 72 remains unchanged in response to gesture 80.

FIG. 4B illustrates an example of a user 96 performing a touch gesture similar to the example of FIG. 4A. In FIG. 4B, the touch gesture is also a pinch open gesture, but the user's fingers travel four inches instead of two inches as shown in FIG. 4A. Thus, the detected property of gesture 86 is determined by the distance of four inches. A module executing on the computing device (e.g., change expanded view module 10 as shown in FIGS. 1, 2) determines that a quantity of metadata 84 including Year, Genre, Comment, and a list of songs associated with album 72, e.g., Song 1-Song N is proportional to the four-inch distance of gesture 86. The computing device subsequently displays an expanded view 82 that includes metadata 84. Thus, FIGS. 4A and 4B illustrate that gestures of different detected propertys generate different quantities of metadata proportional to the detected propertys of the gestures. In this way, a larger gesture, in one example, may allow more information to be displayed in expanded view 82. As shown in FIG. 4B, browsing content such as album 72 remains unchanged in response to gesture 86.

Figure 5A:
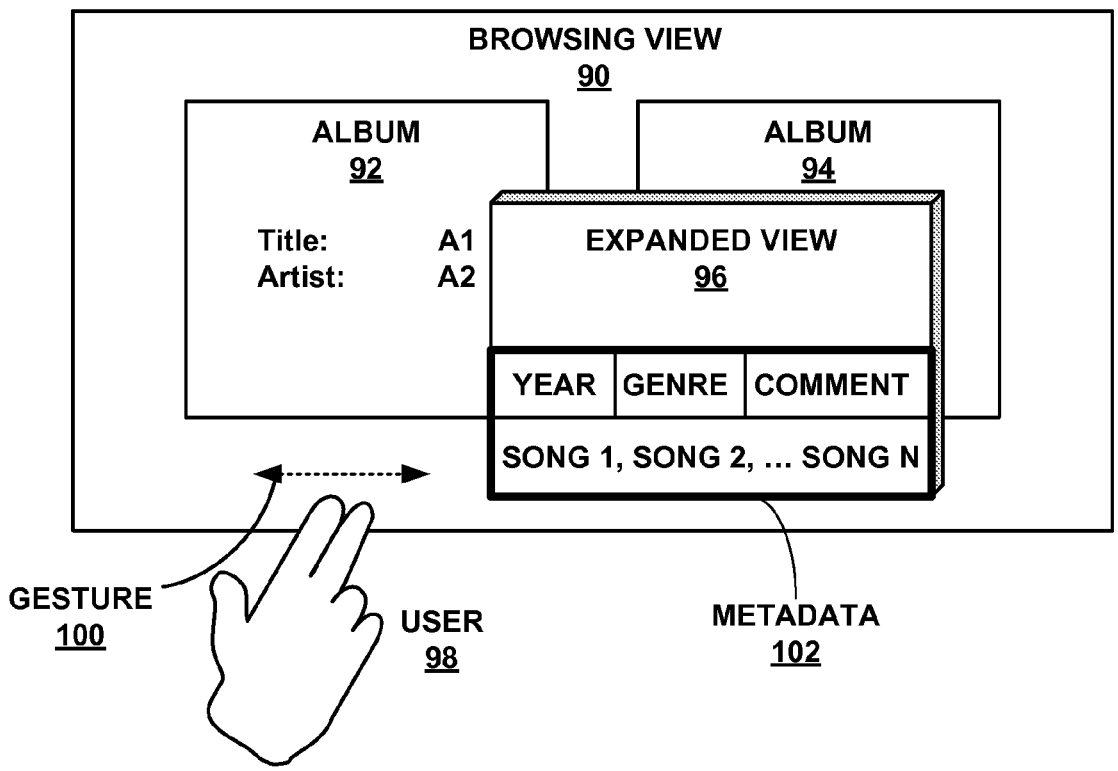
FIGS. 5A and 5B are block diagrams illustrating examples of displaying metadata in one or more expanded views, in accordance with one or more aspects of the present disclosure.
Figure 5B:
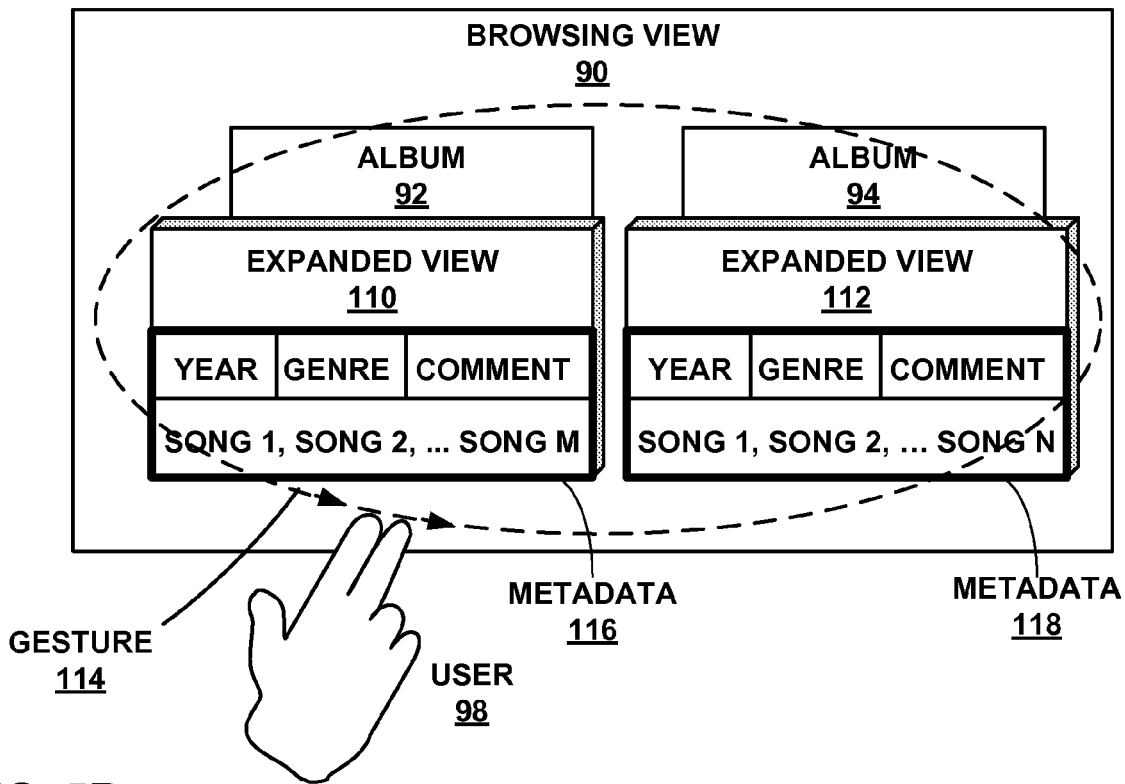

FIGS. 5A and 5B are block diagrams illustrating examples of displaying metadata in one or more expanded views, in accordance with one or more aspects of the present disclosure. For example, FIG. 5A includes a browsing view 90 of a computing device (not shown) similar to computing device 2 as shown in FIG. 1. Browsing view 90 includes two media objects, including images of Album 92 and Album 94. In the example of FIG. 5A, a user performs a gesture 100, e.g., a pinch open gesture, to select Album 92. In accordance with techniques of the disclosure, the computing device displays an expanded view 96 that includes a quantity of metadata 102 associated with Album 92 that is proportional to the detected property of gesture 100. As shown in FIG. 5A, browsing content in browsing view 90 such as albums 92, 94 remain unchanged in response to gesture 100. In the current example, metadata 102 is associated with Album 92. For example, metadata 102 includes year, genre, a comment, and a list of songs 1-N.

FIG. 5B illustrates another example of displaying metadata in response to a gesture. In FIG. 5B, multiple expanded views 110, 112 are displayed in response to gesture 114. For example, user 98 may perform a gesture 114, e.g., a lasso gesture, to select Album 92 and Album 94 at a particular speed. The lasso gesture may include performing a gesture on or near the presence-sensitive screen with one or more fingers that approximately encircles the desired media objects, e.g., Albums 92, 94. In response to receiving gesture 114, a module (e.g., change expanded view module 10 as shown in FIGS. 1, 2) executing on the computing device determines that metadata 116, 118 are associated with the respective selected albums. The module may further determine the speed of the lasso gesture. Based on the speed of the gesture, the computing device subsequently displays expanded views 110, 112 with the respective metadata 116, 118. In another example (not shown), user 98 may perform the lasso gesture at a greater speed than described in FIG. 5B, and consequently, more metadata may be displayed in expanded views 110, 112. As shown in FIG. 5B, browsing content in browsing view 90 such as albums 92, 94 remain unchanged in response to gesture 114. In this way, gestures may be used to display multiple expanded views that contain metadata associated with multiple media objects.

In some examples, the quantity of metadata displayed in each expanded browsing view 90 may be determined with greater granularity. For example, as previously discussed, user 98 may perform a lasso gesture to select Albums 92, 94. In response to the gesture, expanded views 110, 112 with respective metadata 116, 118 may be displayed in browsing view 90. User 98 may perform a subsequent, pinch open gesture to select only expanded view 110. In response to the pinch open gesture, expanded view 110 may display a greater quantity of metadata than is currently displayed in expanded view 110. Thus, in the current example, after the pinch open gesture, expanded view 110 may display more metadata 116 than metadata 118 contained in expanded view 112. Using multiple gestures as previously described, user 98 may select, with greater granularity, the quantity of metadata displayed in each expanded view 110, 112.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

The invention claimed is:

1. A method comprising:
   generating for display, in a graphical user interface (GUI) of a computing device, a browsing view comprising browsing content, wherein the browsing content includes one or more media objects that are displayable in the browsing view;
   receiving, at a presence-sensitive screen of the computing device, user input comprising one or more gestures to select at least one media object of the one or more media objects;
   determining, by the computing device, a magnitude of a detected property of the one or more gestures to select the at least one media object;
   responsive to receiving the user input, selecting a quantity of metadata associated with the at least one selected media object,
      wherein the metadata comprises information that describes the at least one selected media object, wherein the quantity of the metadata is proportional to the magnitude of the detected property; and
   generating for display, in an expanded view of the GUI that includes the browsing view, the metadata associated with the at least one selected media object.

2. The method of claim 1, wherein generating for display, in the expanded view of the GUI that includes the browsing view, the metadata associated with the at least one selected media object further comprises continuously changing the metadata generated for display as the one or more gestures are received.

3. The method of claim 1, wherein generating for display, in the expanded view of the GUI that includes the browsing view, the metadata associated with the at least one selected media object comprises changing the quantity of the metadata generated for display only after at least one of the one or more gestures is received.

4. The method of claim 1, wherein the one or more media objects include one or more music files, image files, video files, or text files.

5. The method of claim 1, further comprising:
   responsive to receiving the user input, determining a second input operation that corresponds to the user input, wherein the second input operation selects a second quantity of second metadata associated with a second selected media object, wherein the second metadata comprises information that describes the second selected media object, and wherein the second quantity of the second metadata is proportional to the detected property of the one or more gestures; and
   generating for display, in the expanded view of the GUI, the metadata associated with the second selected media object.

6. The method of claim 1, wherein the presence-sensitive screen comprises a touch-sensitive screen.

7. The method of claim 6, wherein the one or more gestures comprise one or more touch gestures.

8. The method of claim 1, wherein generating for display, in the expanded view of the GUI, the metadata associated with the at least one selected media object further comprises:
   removing the expanded view from display in the GUI when at least one of the one or more gestures is completed.

9. The method of claim 1, wherein generating for display, in the expanded view of the GUI, the metadata associated with the at least one selected media object further comprises:
   displaying the expanded view of the GUI after the one or more gestures have completed; and
   receiving, using the presence-sensitive screen of the computing device, a terminating gesture, wherein upon completing the terminating gesture, the expanded view of the GUI is removed from display on the presence-sensitive screen.

10. The method of claim 1, wherein generating for display, in the expanded view of the GUI further comprises, generating for display the expanded view of the GUI to overlay the browsing content of the browsing view.

11. The method of claim 1, wherein the one or more gestures to select the at least one media object of the one or more media objects comprise a motion of at least one input unit at or near the presence-sensitive screen.

12. The method of claim 11, wherein the at least one input unit comprises, a finger, input stylus, or pen.

13. The method of claim 11, wherein the detected property of the one or more gestures comprises an amount of pressure applied to the presence-sensitive screen by the at least one input unit when the one or more gestures are performed.

14. The method of claim 11, wherein the detected property of the one or more gestures comprises a rate at which the at least one input unit moves across or near the presence-sensitive screen.

15. The method of claim 11, wherein the detected property of the one or more gestures comprises an amount of time during which the at least one input unit performs the one or more touch gestures.

16. The method of claim 11, wherein the detected property of the one or more gestures comprises a distance traveled of the at least one input unit across or near the presence-sensitive screen.

17. The method of claim 1, wherein the one or more gestures do not magnify the one or more media objects displayable in the browsing view.

18. The method of claim 1, wherein the expanded view is generated for display without changing the browsing content in the browsing view of the GUI.

19. A computer-readable storage medium encoded with instructions that when executed cause one or more processors of a computing device to perform operations comprising:
   generating for display, in a graphical user interface (GUI) of the computing device, a browsing view comprising browsing content, wherein the browsing content includes one or more media objects that are displayable in the browsing view;
   receiving, at a presence-sensitive screen of the computing device, user input comprising one or more gestures to select at least one media object of the one or more media objects;
   determining a magnitude of a detected property of the one or more gestures to select the at least one media object;
   responsive to receiving the user input, selecting a quantity of metadata associated with the at least one selected media object,
      wherein the metadata comprises information that describes the at least one selected media object, wherein the quantity of the metadata is proportional to the magnitude of the detected property; and generating for display, in an expanded view of the GUI that includes the browsing view, the metadata associated with the at least one selected media object.

20. A computing device, comprising:

one or more processors;

an output device to generate, for display, a browsing view in a graphical user interface (GUI) of the computing device, wherein the browsing view comprises browsing content that includes one or more media objects that are displayable in the browsing view;

a presence-sensitive screen to receive user input comprising one or more gestures to select at least one media object of the one or more media objects; and wherein the one or more processors are configured to:
determine a magnitude of a detected property of the one or more gestures to select the at least one media object;
responsive to receiving the user input, select a quantity of metadata associated with the at least one selected media object,
wherein the metadata describes the at least one selected media object, and wherein the quantity of the metadata is proportional to the magnitude of the detected property; and wherein the output device generates for display, in an expanded view of the GUI that includes the browsing view, the metadata associated with the at least one selected media object.

21. A method comprising:

displaying one or more media objects at least one of which having metadata associated therewith, wherein the metadata comprises information that describes the at least one media object;

receiving, at a presence-sensitive screen of a computing device, user input comprising one or more gestures to select the at least one media object;

determining, by the computing device, a magnitude of a property of the one or more gestures to select the at least one media object;

selecting, by the computing device, a quantity of the metadata associated with the at least one selected media object, wherein the quantity of the metadata is proportional to the magnitude of the detected property;

and displaying the selected quantity of the metadata associated with the at least one selected media object.

22. The method of claim 21, wherein the one or more gestures to select the at least one media object of the one or more media objects comprise a motion of at least one input unit at or near the presence-sensitive screen.

23. The method of claim 22, wherein the at least one input unit comprises, a finger, input stylus, or pen.

24. The method of claim 22, wherein the detected property of the one or more gestures comprises an amount of pressure applied to the presence-sensitive screen by the at least one input unit when the one or more gestures are performed.

25. The method of claim 22, wherein the detected property of the one or more gestures comprises a rate at which the at least one input unit moves across or near the presence-sensitive screen.

26. The method of claim 22, wherein the detected property of the one or more gestures comprises an amount of time during which the at least one input unit performs the one or more touch gestures.

27. The method of claim 22, wherein the detected property of the one or more gestures comprises a distance traveled of the at least one input unit across or near the presence-sensitive screen.

* * * * *